Nov. 13, 1962

R. W. BURHANS
COMPUTING SYSTEMS 3,063,637

Filed Dec. 17, 1957

INVENTOR.
RALPH W. BURHANS

BY his ATTORNEYS.

Nov. 13, 1962    R. W. BURHANS    3,063,637
COMPUTING SYSTEMS
Filed Dec. 17, 1957    2 Sheets-Sheet 2

INVENTOR.
RALPH W. BURHANS
BY
*Brumbaugh, Free, Graves & Donohue*
his ATTORNEYS

United States Patent Office 3,063,637
Patented Nov. 13, 1962

3,063,637
COMPUTING SYSTEMS
Ralph W. Burhans, Chagrin Falls, Ohio, assignor to The Standard Oil Company, Cleveland, Ohio, a corporation of Ohio
Filed Dec. 17, 1957, Ser. No. 703,432
11 Claims. (Cl. 235—184)

The present invention relates to analog computer systems, and, more particularly, to novel and improved analog computing means for calculating the value of an expression formed by the sum of a plurality of variables at least some of which are multiplied by respective coefficients of which each is, say, a nonlinear function of a given quantity.

Industrial applications of computing mechanisms are being continuously developed and accepted by industry, as being capable of automatically accomplishing the computation of data in a very short interval of time that would otherwise have to be accomplished in a trial and error procedure over many man hours of work of skilled technicians and engineers. Laborious trial and error paper calculations are currently being used in work involving the summation of a plurality of variables at least some of which are multiplied by respective variable coefficients. For example, in the petroleum industry it is necessary to be able to calculate the distillation curves of multicomponent mixtures comprising a plurality of components at least some of which have distinct nonlinear distillation curves. One such mixture is gasoline which is composed of a plurality of different hydrocarbon components having respectively distinct distillation curves, for the proper blending of which it is necessary to predict the temperatures at which predetermined percentages of the desired blend may be distilled off.

Normally problems of this type can readily be reduced to mathematical notation, even when the coefficients associated with the various variables in the problem are nonlinear in form. However, the solution by ordinary mathematical technique is rendered quite difficult, except possibly by graphical methods. For example, the various components of a mixture may be represented by the variable "$x$." If each of the variables in the mixture remain unmodified, the resultant mixture could be represented by the relation $$x_1 + x_2 + x_3 = 100\% \tag{1}$$

where $x_1$, $x_2$ and $x_3$ represent three different variables. However, at least some of the variables are multiplied by a nonlinear variable coefficient "$y$," which, for example, in the case of the gasoline blending problem would be a function of the nonlinear distillation curve of a particular component of the gasoline blend, i.e., $$y = a \text{ times } f(t) \tag{2}$$

wherein "$a$" represents the percentage of the component which would be distilled off at a particular temperature "$t$" as can be found on a typical Engler type distillation curve. Thus the amount of a particular component present in the distilled-over blend at any given temperature would be represented by the quantity "$xy$," and the percentage amount of distilled-over blend present at such temperature may be represented by the relation $$x_1y_1 + x_2y_2 + x_3y_3 = (x_1 + x_2 + x_3)y_c \tag{3}$$

In accordance with the invention, nonlinear function generating means are used to represent the nonlinear variable coefficients respectively associated with at least some of the respective variables. An electrical potential representative of the respective variable is then modified by being, in effect, multiplied in accordance with a value of the nonlinear variable coefficient associated with such variable, such coefficient value being determined by a setting of the function generating means to represent a particular selected value of the quantity (e.g. temperature) of which such coefficient is a function. Such modified electrical potentials along with electrical potentials representative of other variables and constants forming components of the composite are combined, and the sum of the combined electrical potentials is utilized to determine the value of the above Expression 3.

For a more complete understanding of the invention, reference may be had to the following detailed description taken in conjunction with the accompanying figures of the drawing, in which.

Figures 1, 1A:
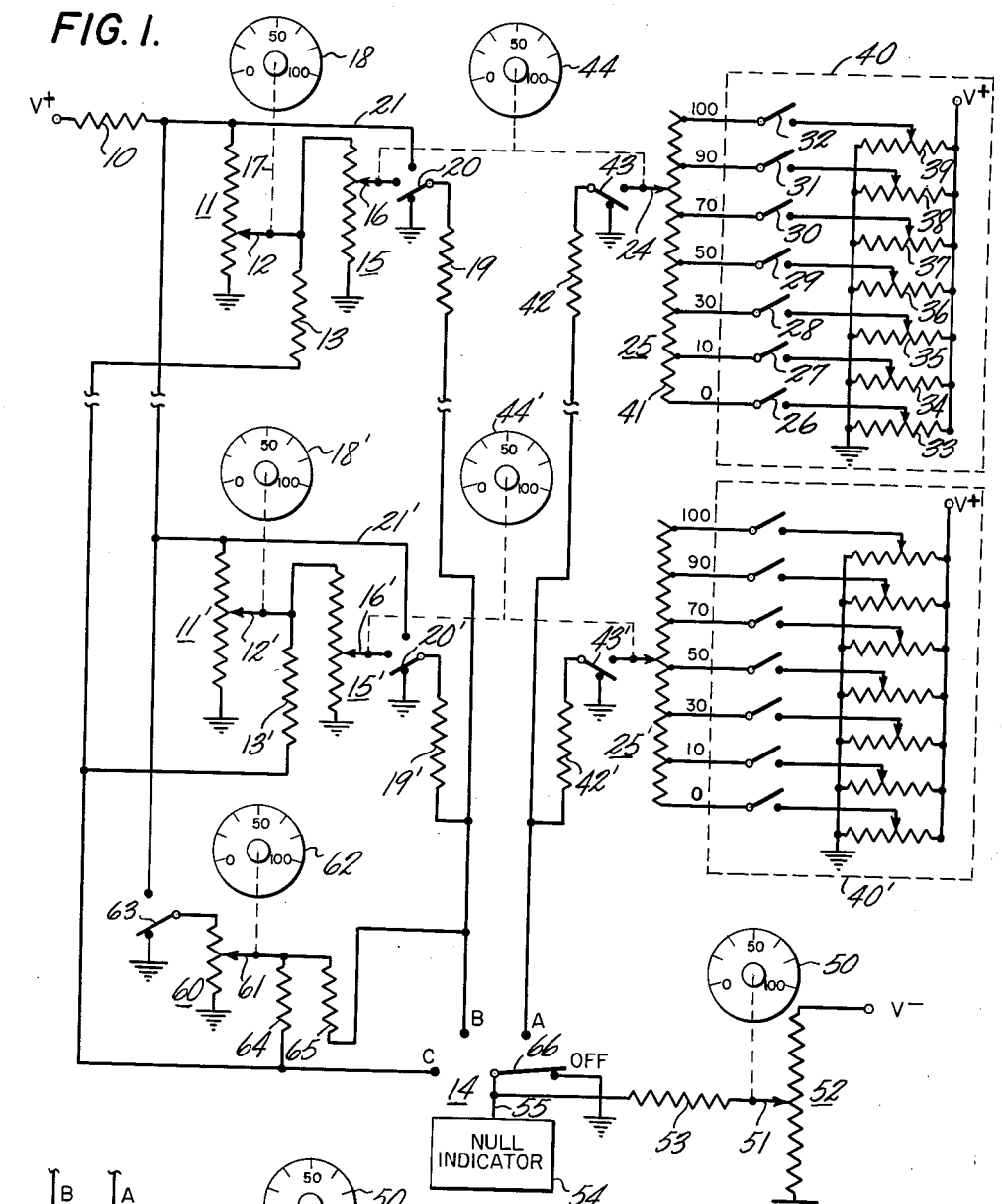
FIGURE 1 is an electrical schematic diagram of a preferred embodiment of the invention.
FIG. 1A is an electrical schematic diagram of an alternate portion of the embodiment of FIG. 1 substituting automatic servomechanism control for manual null indicating control of the read-out mechanism of the computer of FIG. 1.

In the preferred embodiments of the invention, it is intended that the computing systems be A.C. operated using opposite phase reference voltages for the purposes of calculation. These opposite phase reference voltages are represented by the symbol $V^+$ for a source of reference voltage of one phase, and $V^-$ for the reference voltage source of opposite phase. Corresponding circuitry and components of each of the variables in the disclosed embodiments have the same reference characters, distinguished by primed designations.

In the embodiment of FIG. 1, a reference voltage source of one phase, designated $V^+$, is connected through an isolating resistance 10 to a system ground through a linear potentiometric device 11, the output of which is intended to be representative of the unmodified magnitude of the variable $x_1$, for example. The linear potentiometric device 11 includes a wiper 12 connected (1) through a summing resistance 13 to a point C on a multi-position selector switch 14, and (2) to the system ground through a second linear potentiometric device 15 including a wiper 16. The output signal of the linear potentiometric device 15 is representative of the magnitude of the variable $x_1$ as modified in accordance with the position of the wiper 16, which position is varied in accordance with a nonlinear function, as will be hereinafter described.

The position of the wiper 12 may be manually controlled by suitable conventional mechanical linkage (represented by a dashed line 17) to a dial means 18.

A point B in the multi-position selector switch 14 is connected through a summing resistance 19 and a respective switching means having a movable contact arm 20: (1) in the Off position, to a system ground; (2) in the Set position, to the reference voltage source $V^+$ by means of a conducting means 21 and the isolating resistance 10; and (3) in the Run position, to the wiper 16.

The multiplying factor $y_1$ for the respective variable $x_1$ is determined by the position of a wiper 24 of a multiple tap, linear potentiometric device 25 having taps numbered, for example, 0, 10, 30, 50, 70, 90, and 100. Each of the multiple taps of the potentiometric device 25 are connected through single-pole-single-throw switches 26, 27, 28, 29, 30, 31 and 32, respectively, to wipers on respective calipering potentiometers 33, 34, 35, 36, 37, 38 and 39, each connected between a reference voltage source $V^+$ and a system ground. The calipering potentiometers 33, 34, 35, 36, 37, 38 and 39 form a function voltage source 40 for determining the voltage drop along the coils 41 between adjacent taps on the potentiometric device 25.

Since the potentiometric device 25 is linear, the potential along the coils 41 between two adjacent taps which are energized from respective calipering potentiometers varies linearly. However, the degree of potential change between two adjacent energized taps is dependent upon the setting of the respective calipering potentiometers. Thus, the linear potentiometric device 25 acts as a function generating means suitable for providing a voltage representation of a straight-line segment curve of variable slope between each of the taps.

A point A on the multi-position selector switch 14 is connected through a summing resistance 42 and a switching means including a movable contact arm 43: (1) in the Off position, to a system ground; and (2) in the Set position, to the wiper 24.

The wipers 16 and 24 of the potentiometric devices 15 and 25, respectively, are preferably ganged together under the control of a manually operable dial means 44.

A read out dial 50 is mechanically connected to a wiper 51 of a linear potentiometric device 52 connected between a reference voltage source V−, of opposite phase to the previously mentioned sources, and a system ground. The wiper 51 is connected through a summing resistance 53 to a null indicator 54 by a conducting means 55. The conducting means 55 is also connected to the movable contact arm 66 of the multi-position selector switch 14.

The null indicator may be of any suitable conventional form such a glow discharge device, e.g., a neon bulb, adapted to indicate the presence of a null or balance between two opposed input signals by the absence or presence of a predetermined signal.

Linear variables or constants may be introduced into the system by means of a linear potentiometric device 60 having a wiper 61 controlled by a manually operable dial means 62. The potentiometric device 60 is connected at one end to the system ground and at its other end through a switching means having a movable contact arm 63: (1) in the Off position, to the system ground; or (2) in its operative position, to the reference voltage source V+ through the isolating resistance 10. The voltage output of the potentiometric device 60 is connected to the point C on the multi-position selector switch 14 through a summing resistance 64; and to the point B on the multi-position selector switch 14 through the summing resistance 65.

When the computing device is in the Off position, the movable contact arm 66 of the multi-position selector switch 14 engages the contact point Off, connecting the conducting means 55 to the system ground.

Figure 3:
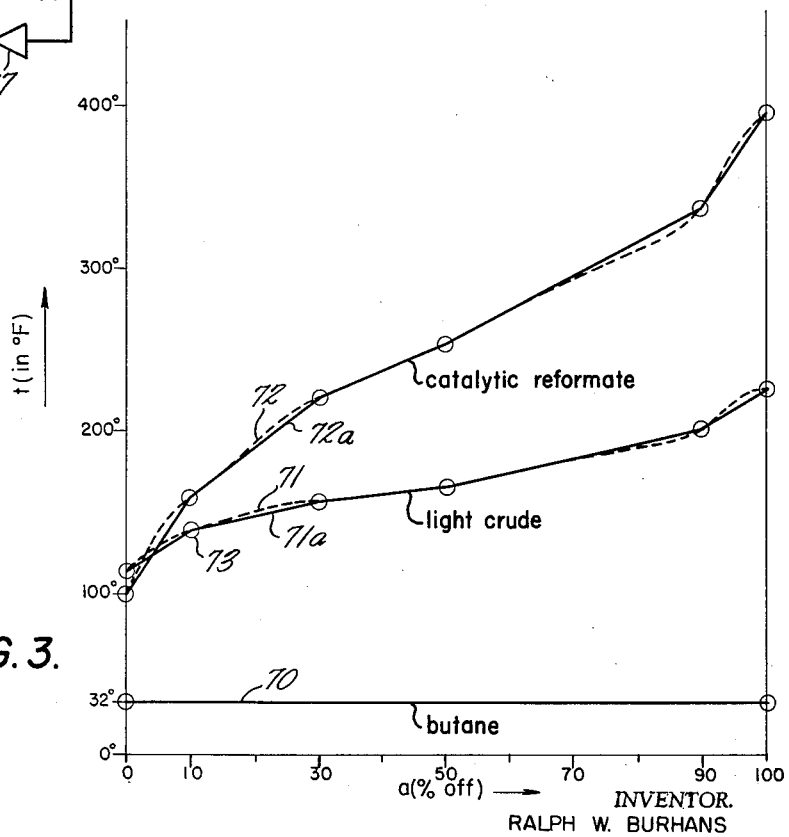
FIG. 3 is a graphical representation of a plurality of curves representing nonlinear variable coefficient characteristics.

In an exemplary embodiment of the invention, the computing device is used for calculating the distillation curves of multi-component mixtures such as gasoline blends. For example, the desired gasoline blend may be formed of a combination of catalytic reformate, light crude oil and butane, with respective distillation curves as shown in FIG. 3. The distillation curve 70 for butane is a straight line indicating that at a temperature of 32° F. all of the butane present in the multi-component mixture will distill off. However, with regard to the other components, varying percentages of the component will be distilled off at different temperatures of the mixture as indicated by the dotted line distillation curves 71 and 72 for light crude and catalytic reformate, respectively. These individual distillation curves may be conventional Engler curves. It has been found that these curves are susceptible of representation by straight-line segment curves 71a and 72a passing through preselected inflection points, the straight-line segment curve being in substantial conformity with the normal distillation curve at least over the major portion of its excursion. It has been found, in the case of distillation curves, that this type of segment representation by a straight-line segment curve is inaccurate chiefly in the region of 95% to the end point and also in the range from the initial boiling point to the 5% point. These inaccuracies or discrepancies, in accordance with the invention, may be overcome by various well known compensating methods.

Some or all of the taps on the linear multiple tap potentiometric devices 25 and 25′ correspond to various inflection points of the straight line segment curves 71a and 72a. In the particular example, it is seen that inflection points for the curves 71a and 72a are at 0%, 10%, 30%, 50%, 90% and 100%. Therefore, if appropriate potentials are placed upon taps 0, 10, 30, 50, 90 and 100 of the potentiometric device 25, the potential distribution along the coils 41 of the potentiometric device 25 will correspond with the straight-line segment curve 71a, for example.

In operation, the potential distribution for the nonlinear function to be represented by, say, the potentiometric device 25 is produced in a step by step manner. Let it be assumed that the variable $x_1$ is the light crude component. That being the case, the movable contact arm 43 of the $x_1$ component is moved into the operative position connecting the wiper 24 through the summing resistance 42 to the point A in the multi-position selector switch 14, and the switch blade 66 of the selector switch 14 is placed in contact with the point A thereof. The dial means 44 is then turned to the 0 position, which will place the wiper 24 opposite the 0 tap. The switch 26 is closed. The temperature reading for the 0%–Off point on curve 71a is then set on the read-out dial 50, causing the wiper 51 to assume a position on the potentiometric device 52 providing an electrical potential signal on the conducting means 55 representative of the temperature at the 0%–Off point for the curve 71a. With all of the other switches 27 through 32, inclusive, in their Open position, the wiper of the calipering potentiometer 33 is adjusted until a voltage signal on the conducting means 55 of the opposite phase to that produced by the potentiometric device 52, but of equal amplitude, is produced. This condition is indicated by a null reading on the null indicator 54.

The temperature for the next inflection point 73 on the straight line curve 71a, corresponding to the 10%–Off point on the distillation curve is then set on the dial means 50. With switch 27 closed, but with switches 26 and 28 through 32, inclusive, preferably open, the wiper of the calipering potentiometer 34 is adjusted until there is a null indication on the null indicator 54. Similarly, each of the remaining points 30, 50, 90 and 100 are independently set at particular electrical potentials corresponding to the different inflection points of the straight-line segment curve 71a.

The movable contact arm 43 is then opened and the contact arm 43′ of the next variable $x_2$, for example, the catalytic reformate represented by the straight line curve 72a, is closed and each of the points on the potentiometric device 25′ corresponding to the different inflection points of the straight-line segment curve 72a are set by adjustment of the individual calipering potentiometers of the function voltage source 40′.

Since the amount of butane being distilled off does not vary with temperature, the variable representative of the amount of butane in the mixture is not modified by a nonlinear coefficient, and no multiple-tapped, linear potentiometric device is needed.

In the next step, the magnitude of each of the variables unmodified by any coefficient is set by the respective dial means 18, 18′ and 62. With the contact arm 66 of the multi-position selector switch 14 in the C position, and with the read-out dial 50 set at 100%, a null reading on the null indicator 54 indicates that $$x_1 + x_2 + x_3 + \ldots = 100\%$$

In the case of the gasoline blend of the example, the setting for the dial 18 should represent the percentage of light crude in the mixture before distillation, the setting of the dial 18′ represents the percentage of catalytic reformate in the mixture before distillation, and the setting of the dial 62 indicates the percentage of butane in the mixture before distillation.

After having set the value of the various variables involved in the calculation, the nonlinear coefficient potentiometric devices 25, 25′, etc., must be individually set for the particular restrictive value to be used during the problem. For example, in the case of the gasoline blend, it is the purpose of a volatility test to determine just what percentage of the blend or mixture would be distilled off at a preselected temperature. Therefore, the preselected temperature would be set by the read-out dial means 50 and the coefficients (functions of the distillation curves) which are associated with the different variables (the components of the gasoline blend) are individually set by closing the respective switch blade 43 with the switch blade 66 of the multiposition selector switch 14 in the A position and adjusting the respective dial means 44 for a null reading on the null indicator 54. This adjustment causes the wiper 24 to be moved to a position on the potentiometric device 25 that will produce an electric potential on the conducting means 25 to balance out the electric potential produced by the potentiometric device 52. Since the wiper 16 is ganged to the wiper 24, the setting of the wiper 16 is simultaneously controlled.

The movable contact arm 66 of the selector switch 14 is then placed in the B position and the switch blades 20, 20′, etc., of the modified variables are placed in the Run position connecting the wipers 16 and 16′, etc., through the summing resistances 19 and 19′, etc., to the conducting means 55. Also, the contact arms 63 of the unmodified variables or constants are connected in their operative position to the voltage reference source V+ through the isolating resistance 10, thereby energizing the potentiometric device 60 and providing an electric potential on the conducting means 55 through the summing resistance 65.

At that time, electric potentials of a phase determined by the reference voltage source V+ appear on the conducting means 55 representing all of the modified and unmodified variables and constants, i.e., electric potentials representative of the percentage of the various components at the particular point in the distillation process. The sum of these electric potentials is determined by adjusting the read-out dial 50 to provide a null reading on the null indicator 54. In the case of the gasoline blend, assuming all of the various components of the mixture were represented by various settings on the dials 18, 18′, . . . , and 62, accounting for 100% of the variables and constants before modification, the reading on the read-out dial 50 at the time of a null indication will represent the percentage of the composite blend that is distilled off at a particular temperature.

Thus there has been provided in accordance with the invention a novel and improved analog computing device.

In the alternative embodiment of FIG. 1A, a suitable servo-amplifier means 80 having its input connected to the conducting means 55 and its output controlling a conventional servo-motor 81 may be substituted for the null indicator 54. In which case, the servo-motor 81 through conventional drive mechanisms controls the movement of the wiper 51 and the dial 50, thereby providing an automatic read-out. For example, with signals representative of the various variables, modified in accordance with particular values of the nonlinear coefficients respectively associated therewith being set on the potentiometric devices 15 and 15′, etc., and the contact arm 66 of the selector switch 14 being in position B, the servo-amplifier 80 and servo-motor 81 automatically cause the read-out dial 50 to provide an indication of the value of the above Expression 3, e.g., the %–Off of a gasoline blend at a particular temperature.

Figure 2:
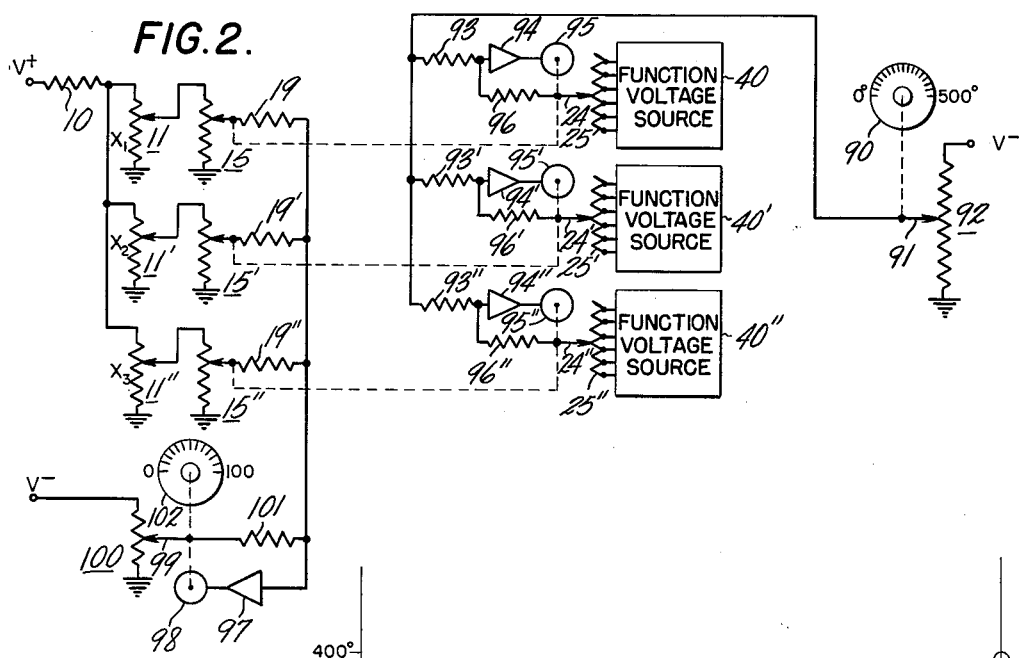
FIG. 2 is an electrical schematic diagram showing an alternate embodiment of the invention, in which the computing system functions automatically eliminating all trial and error procedures on the mechanism.

In some cases, it is desirable to provide an automatic computing system which would eliminate all manual nulling of the various dials. For example, in the alternate embodiment of FIG. 2, with the function voltage sources 40, 40′ and 40″ having been set in a manner such as that described above with regard to FIG. 1, and the unmodified magnitudes of the variables $x_1$, $x_2$ and $x_3$ being set on the potentiometric devices 11, 11′ and 11″, it is only necessary to vary a factor such as temperature through a given range by turning the dial means 90 controlling a wiper 91 of a linear potentiometric device 92 connected between a reference voltage source V− and a system ground. The output voltage from the potentiometric device 92 is fed across summing resistors 93, 93′ and 93″ to the input of individual servo-amplifiers 94, 94′ and 94″, respective to each of the variables, for controlling suitable servo-motors 95, 95′ and 95″. The servo-motors 95, 95′ and 95″ drive the wipers 24, 24′ and 24″ across the linear multiple-tap potentiometric devices 25, 25′ and 25″, respectively, which are energized from respective function voltage sources 40, 40′ and 40″.

The electric potential picked up by the wipers 24, 24′ and 24″ are fed through summing resistances 96, 96′ and 96″ to the inputs of the respective servo-amplifiers 94, 94′ and 94″. The potentials across the summing resistances 93 and 96, 93′ and 96′, and 93″ and 96″ are in phase opposition and act to cause the servo-motors 95, 95′ and 95″ to drive the wipers 24, 24′ and 24″ to the correct position on the respective potentiometric devices 25, 25′ and 25″.

Simultaneously, the wipers on the potentiometric devices 15, 15′ and 15″, which are ganged to the wipers 24, 24′ and 24″, respectively, are driven to selected positions controlling the modified outputs representative of the modified variables $x_1$, $x_2$ and $x_3$ across the respective summing resistances 19, 19′ and 19″ to the input of a servo-amplifier 97 controlling a servo-motor 98. The servo-motor 98 drives a wiper 99 of a linear potentiometric device 100 connected between a reference voltage source V− and the system ground. The electric potential picked up by the wiper 99 is fed through a summing resistance 101 through the input of the servo-amplifier 97 in phase opposition to the electric potential supplied through the summing resistances 19, 19′ and 19″. An indication of the value of the above relation (3) determined by the computing device in response to the setting of the dial 90 is given by a suitable readout dial 102.

In an exemplary operation, as in the case of the determination of the volatility characteristics of the gasoline blend, with the magnitude of the various components of the blend set on potentiometric devices 11, 11′ and 11″ and their distillation characteristics respectively represented by the function generating potentiometric devices 25, 25′ and 25″, the dial 90 would serve as a temperature dial which is turned by hand through a given temperature range. As the dial 90 is turned, the servo-motors 95, 95′ and 95″ automatically balance the correct %–Off members and the read-out dial 102 reads the %–Off of the final selected blend. Thus it is just a matter of selecting a trial blend and then turning the temperature dial till the desired %–Off appears.

It will be understood by those skilled in the art that each of the above described embodiments is meant to be merely examplary, and that they are susceptible of modification and variation within the spirit and scope of the invention. For example, while particular numbers of variables and coefficients therefor have been shown in the various embodiments, it will be apparent that the invention is equally applicable to use with greater and different numbers of variables and/or variable coefficients. Also, the principles and embodiments of the invention have application to various forms of simultaneous nonlinear equation solving computing means and optimizing computer apparatus. Therefore, the invention is not deemed to be limited except by the appended claims.

I claim:
1. An analog computer for calculating the value of the expression $x_1y_1 + \ldots x_iy_i + \ldots x_ny_n$ where $x_1, \ldots x_i, \ldots x_n$ are variables and $y_1, \ldots y_i, \ldots y_n$ are coefficients of which at least $k$ are characterized by a variation in value as a function of a quantity, said computer comprising, $k$ spatially elongated impedance means respectively corresponding to said $k$ coefficients, and any $j$th of said $k$ means having thereon a plurality of taps of which each represents a different value of said $j$th coefficient, means to establish on each tap the $j$th impedance means an electric potential simulative of the value for the quantity of which said $j$th coefficient is a function at that particular value for said $j$th coefficient which is represented by such tap, whereby the variation in potential over the length of such $j$th means is approximately simulative of the variation in value of such quantity for a variation in value of said $j$th coefficient, $n$ voltage sources respectively corresponding to said $n$ variables and any $i$th of said $n$ sources providing a voltage simulative of the $i$th of said $n$ variables, $n$ electrical multiplying means of which any $i$th thereof is connected to the $i$th source to receive the $i$th voltage as a first input thereto, and of which any $i$th thereof is adapted to yield an $i$th electrical output of which the value is simulative of the product of the values respectively simulated by said $i$th voltage input thereto and by a second input to such $i$th multiplying means, $k$ coupling means respectively corresponding to said $k$ impedance means, and any $j$th of said $k$ coupling means operatively coupling the $j$th of said $k$ impedance means to the $j$th of the corresponding $k$ of said multiplying means to provide the latter with said second input in an amount representative of the value simulated by said $j$th impedance means for said $j$th coefficient when the quantity functionally related thereto has a selected value, means to provide a second input of selected amount for each of any of said $n$ multiplying means which remain after exclusion of the $k$ thereof provided with a second input by said $k$ coupling means, and means to additively combine the electrical outputs of said $n$ multiplying means to thereby obtain an electrical indication of the value of said expression.

2. An analog computer for calculating the value of the expression $x_1y_1 + \ldots x_iy_i + \ldots x_ny_n$ where $x_1, \ldots x_i, \ldots x_n$ are variables and $y_1, \ldots y_i, \ldots y_n$ are coefficients of which at least $k$ are characterized by a variation in value as a function of a quantity, said computer comprising, $k$ spatially elongated impedance means respectively corresponding to said $k$ coefficients, and any $j$th of said $k$ means having thereon a wiper slidable over the length thereof and, also, a plurality of taps of which each represents a different value of said $j$th coefficient, means to establish on each tap of the $j$th impedance means an electric potential simulative of the value for the quantity of which said $j$th coefficient is a function at that particular value for said $j$th coefficient which is represented by such tap, whereby the variation in potential over the length of such $j$th means is approximately simulative of the variation in value of such quantity for a variation in value of said $j$th coefficient, and whereby the wiper on such $j$th means may be adjusted to a setting thereon at which the potential on such wiper simulates a selected value of said such quantity and, also, the relative position of such wiper in the length of said $j$th means simulates the value of said $j$th coefficient which is functionally related to said selected value of said quantity, $n$ voltage sources respectively corresponding to said $n$ variables, and any $i$th of said $n$ sources providing a voltage simulative of the $i$th of said $n$ variables, $n$ electrical multiplying means of which any $i$th thereof is connected to the $i$th source to receive the $i$th voltage as a first input thereto, and of which the $i$th thereof is adapted to yield an $i$th electrical output of which the value is simulative of the product of the values respectively simulated by said $i$th voltage input thereto and by a second input to such $i$th multiplying means, $k$ coupling means respectively corresponding to said $k$ impedance means, and any $j$th of said $k$ coupling means operatively coupling the wiper of the $j$th of said $k$ impedance means to the $j$th of the corresponding $k$ of said multiplying means to provide the latter with said second input in an amount representative of the value simulated by the position of such wiper of such $j$th impedance means when the potential on such wiper simulates a selected value, means to provide a second input of selected amount for each of any of said $n$ multiplying means which remain after exclusion of the $k$ thereof provided with a second input by said $k$ coupling means, and means to additively combine the electrical outputs of said $n$ multiplying means to thereby obtain an electrical indication of the value of said expression.

3. An analog computer for calculating the value of the expression $x_1y_1 + \ldots x_iy_i + \ldots x_ny_n$ where $x_1, \ldots x_i, \ldots x_n$ are variables and $y_1, \ldots y_i, \ldots y_n$ are coefficients of which at least $k$ are characterized by a variation in value as a function of a quantity, said computer comprising $k$ spatially elongated impedance means respectively corresponding to said $k$ coefficients, and any $j$th of said $k$ means having thereon a first wiper slidable over the length thereof and, also, a plurality of taps of which each represents a different value of said $j$th coefficient, means to establish on each tap of the $j$th impedance means an electric potential simulative of the value for the quantity of which said $j$th coefficient is a function at that particular value for said $j$th coefficient which is represented by such tap, whereby the variation in potential over the length of such $j$th means is approximately simulative of the variation in value of such quantity for a variation in value of said $j$th coefficient, and whereby the said first wiper on such $j$th means may be adjusted to a setting thereon at which the potential on such wiper simulates a selected value of such quantity and, also, the relative position of such wiper in the length of said $j$th means simulates the value of said $j$th coefficient which is functionally related to said selected value of said quantity, $n$ voltage sources respectively corresponding to said $n$ variables, and any $i$th of said $n$ sources providing a voltage simulative of the $i$th of said $n$ variables, $n$ linear potentiometers of which any $i$th thereof is connected to the $i$th source to have the $i$th voltage applied across the length of the potentiometer, and of which any $i$th thereof has a second wiper slidable over the length of the potentiometer, $k$ mechanical coupling means respectively corresponding to said $k$ impedance means, and any $j$th of said $k$ coupling means connecting the first wiper of the $j$th of said $k$ impedance means with the second wiper of the $j$th of the corresponding $k$ of said potentiometers to produce ganged sliding of such first and second wipers over the lengths of, respectively, said $j$th impedance means and said $j$th potentiometer, and means to additively combine the electrical outputs respectively appearing on said second wipers to thereby obtain an electrical indication of the value of said expression.

4. A computer as in claim 3 in which each of said $k$ spatially elongated impedance means is a tapped linear potentiometer.

5. A computer as in claim 4 further comprising, means adapted by indicating the potential appearing on the first wiper on any $j$th of said tapped linear potentiometers to permit such wiper to be set so as to have a pre-selected value of potential appear thereon.

6. An analog computer comprising, a plurality $k$ of tapped potentiometers each having a first wiper, means associated with each such potentiometer to produce a selected value of potential at each tap thereof, a plurality of at least $k$ linear potentiometers each having a second wiper thereon and each of $k$ of such linear potentiometers corresponding to a respective one of said $k$ tapped potentiometers, a plurality of variable voltage sources each adapted to energize with voltage a respective one of said linear potentiometers, a plurality $k$ of wiper-linking means each mechanically connecting the first wiper of a respective one of said tapped potentiometers with the second wiper of the corresponding linear potentiometer to product ganged travel of such first and second wipers over the potentiometers to which they respectively belong, common potentiometer means adapted to provide voltage of selectable value for comparison purposes, means adapted by comparing voltage from said common potentiometer means with the respective voltages on said first wipers to indicate any difference in value between the former voltage and any one of the latter voltages, and voltage-combining means responsive to the respective voltages on said second wipers to produce an output voltage representative of the sum of said second-wiper voltages.

7. An analog computer comprising, a plurality $k$ of tapped potentiometers each having a first wiper, means associated with each such potentiometer to produce a selected value of potential at each tap thereof, a plurality of at least $k$ linear potentiometers each having a second wiper thereon and each of $k$ of such linear potentiometers corresponding to a respective one of said $k$ tapped potentiometers, a plurality of variable voltage sources each adapted to energize with voltage a respective one of said linear potentiometers, a plurality $k$ of wiper-linking means each mechanically connecting the first wiper of a respective one of said tapped potentiometers with the second wiper of the corresponding linear potentiometer to produce ganged travel of such first and second wipers over the potentiometers to which they respectively belong, voltage combining means responsive to the respective voltages on said second wipers to produce an output voltage representative of the sum of said second wiper voltages, common potentiometer means adapted to provide voltage of selectable value for comparison purposes, and means adapted by selectively comparing voltage from said common potentiometer means with said output voltage and with the respective potentials on said first wipers to indicate any difference in value between the former voltage and any selected one of said output voltage and first-wiper potentials.

8. A computer as in claim 7 wherein said first wiper potentials and said output voltage are alternating voltages of one phase, and wherein said common potentiometer means provides alternating voltage of opposite phase.

9. A computer as in claim 8 wherein said comparing-indicating means comprises a null detector.

10. A computer as in claim 8 wherein said comparing-indicating means comprises servo-mechanism means for controlling said common potentiometer means.

11. A computer as in claim 8 wherein said common potentiometer means comprises independent first and second common potentiometers, and said comparing-indicating means comprises first servo-mechanism means responsive to voltage of selected value from said first common potentiometer and to the respective voltages on said first wipers to control the settings of said first wipers on their respective tapped potentiometers so as to equalize each first-wiper voltage with said voltage from said first common potentiometer, and said comparing-indicating means also comprises second servo-mechanism means responsive to said output voltage and to the voltage from the wiper of said second common potentiometer to control the setting of such wiper on said second common potentiometer so as to equalize said last named voltage with said output voltage.

References Cited in the file of this patent

UNITED STATES PATENTS

| | | |
|---|---|---|
| 2,443,098 | Dean | June 8, 1948 |
| 2,784,909 | Kirkpatrick | Mar. 12, 1957 |
| 2,905,821 | Younkin | Sept. 22, 1959 |

OTHER REFERENCES

"A Computer for Solving Linear Simultaneous Equations," Berry et al. Journal of Applied Physics, vol. 17, No. 4, April 1946, pp. 262–272.

"Electronic Analog Computers" (Korn and Korn), published by McGraw-Hill Book Company Inc. (New York), (page 263 relied on).